March 7, 1939.  S. N. HURT  2,149,888
WEIGHING SCALE
Filed Dec. 3, 1937  2 Sheets-Sheet 1
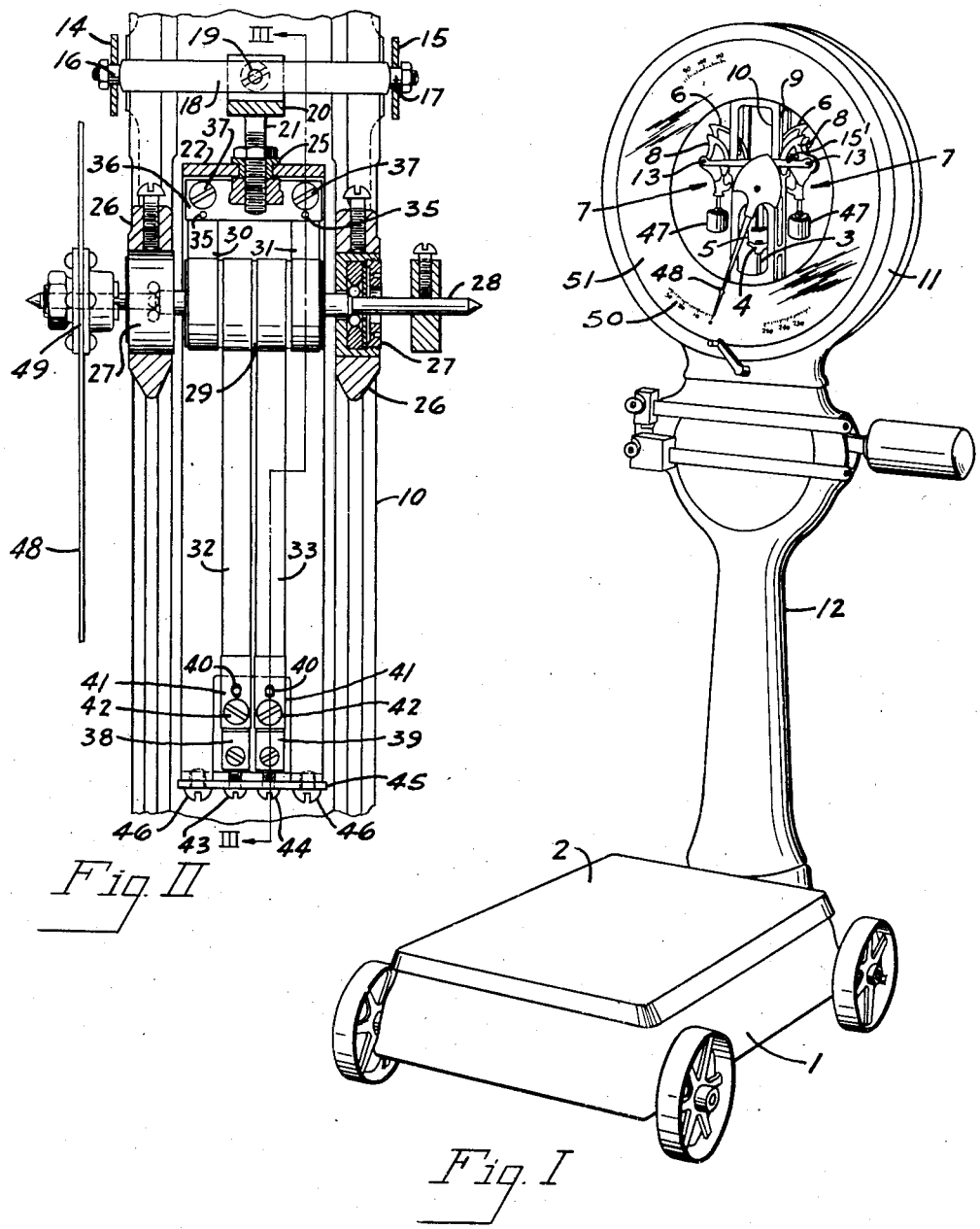
Fig. II
Fig. I
Samuel N. Hurt
INVENTOR
BY Marshall & Marshall
ATTORNEY March 7, 1939.　　　S. N. HURT　　　2,149,888
WEIGHING SCALE
Filed Dec. 3, 1937　　　2 Sheets-Sheet 2
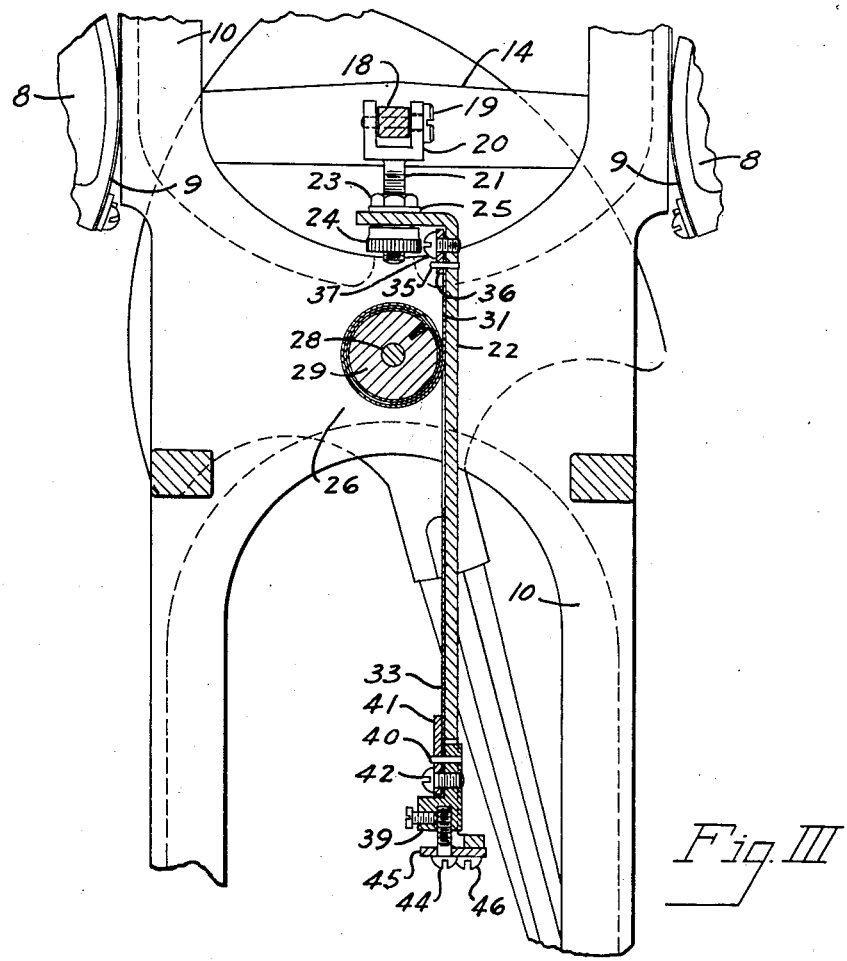
Fig. III
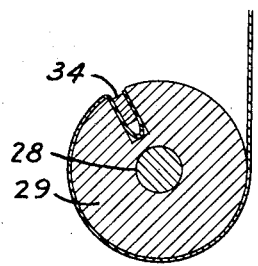
Fig. IV
Samuel N. Hurt
INVENTOR
BY Marshall & Marshall
ATTORNEY Patented Mar. 7, 1939

2,149,888

UNITED STATES PATENT OFFICE 2,149,888

WEIGHING SCALE

Samuel N. Hurt, Toledo, Ohio, assignor to Toledo Scale Manufacturing Company, Toledo, Ohio, a corporation of New Jersey Application December 3, 1937, Serial No. 177,951

4 Claims. (Cl. 265—62)

This invention relates to improvements in weighing scales, and is more particularly directed to improvements in the means for translating reciprocatory motion of the weighing mechanism into rotation of the indicator.

The principal object of the invention is the provision of improved means for actuating a scale indicator.

Another object is the provision of an improved indicator actuating means employing a plurality of flexible metallic ribbons and in which the ribbons are under equal tension.

Another object is the provision of a scale motion translating device having no "lost" motion; and, Still another object is the provision of an improved scale motion translating device which is universally self-aligning.

These, and other objects and advantages will be apparent from the following description in which reference is had to the accompanying drawings, illustrating a preferred embodiment of the invention and in which similar reference numerals designate similar parts throughout the several views.

In the drawings:

Fig. I is a perspective view of a well-known type of weighing scale embodying the invention.

Fig. II is an enlarged view of a preferred embodiment of the invention, showing fragmentary portions of other scale parts.

Fig. III is a sectional view therethrough, the section being substantially along the line III—III of Figure II; and Fig. IV is an enlarged cross section through the indicator pulley showing in detail the method of assembling the flexible ribbons thereto.

Referring to the drawings in detail, a base 1, which is preferably a rigid iron casting, houses a load supporting lever system (not shown) upon which a load receiving platform 2 is pivotally mounted. Through well-known intermediate mechanism (not shown herein) the load supporting levers are operatively connected to a short pull rod 3 which engages a yoke 4 fastened to the lower ends of flexible metallic ribbons 5 whose other ends overlie and are fastened to the upper ends of arcuate faces of power sectors 6. These sectors 6 are functionally integral parts of load counterbalancing pendulums 7. A plurality of fulcrum sectors 8, which also are functional integral parts of the pendulums, are suspended by means of flexible metallic ribbons 9, from vertically extending pillars of a pendulum frame 10 that is securely bolted to the interior of a housing 11 which surmounts a column 12 which is bolted to an extending deck of the base 1.

In each pendulum the power sectors 6 and the fulcrum sectors 8 are provided with bores at their centers of revolution whose axes are at an angle of 90° to a plane passing longitudinally through their faces and projecting through and locked in these bores is a hardened and ground shaft.

For the purpose of providing convenient means for coupling the pendulums to indicating means, conically pointed pivots 13, whose points enter accurately drilled holes in the ends of the aforementioned hardened and ground shaft, are threaded through the ends of side plates 14 and 15 of a compensating frame 15'. This frame 15' is thus, by the pivots 13 freely suspended from the pendulums and partakes of their vertical, reciprocatory motion. Apertures which form bearings for trunnions 16 and 17, machined on the ends of a short shaft 18, are accurately positioned midway between the pivots 13 in the side plates 14 and 15. This shaft 18 has a rectangular cross section and pivotally supports a clip 20 by means of a tenoned and threaded shoulder screw 19, which extends through holes in furcated arms of the clip and an aperture in the shaft which is located midway between the trunnions 16 and 17.

To a downwardly extending threaded stem 21, of the clip 20, a translator frame in the form of a substantially Z shaped plate 22 is clamped, by means of two nuts 23 and 24 which engage opposite ends of a bushing 25 extending freely through the upper horizontally extending arm of the Z. Since the bushing 25 is slightly longer than the thickness of the plate 22, this plate is free to align itself. The translator frame 22 is preferably stamped from rust resisting steel alloy and then hardened and ground.

The pendulum frame 10 is provided with horizontally extending connection plates 26 having bored holes in which ball bearings 27 are seated and an indicator shaft 28 having accurately ground tenons is rotatably seated in these bearings 27. Circumjacently fixed on said shaft 28 is a cylindrical member 29, preferably machined from an aluminum alloy and accurately ground.

This cylindrical member 29 forms a pulley for indicator actuating ribbons 30—31 and 32—33, and is a substitute for the usually employed indicator pinion. For the purpose of securing the ends of ribbons 30—31 and 32—33 in a manner so that no screws or clamps, extending beyond the periphery are necessary, a longitudinally extending slot is milled in the cylindrical member 29. One end of each of the aforementioned flexible metallic ribbons is annealed and bent at right angles (see Fig. IV), and this bent portion is folded on itself substantially as shown. These bent ends are inserted in the milled slot of the cylindrical member 29 and a straight sided piece of metal 34 of proper thickness is wedged into the V's of the ribbon ends, thus securely locking these ribbons to the cylindrical member 29. The ribbons 30 and 31 which extend upwardly from the cylindrical member 29 have two accurately spaced holes adjacent their free ends, one of which is adapted to embrace pins 35 studded into the vertically extending plate portion of the translator frame 22. A suitably designed clamping plate 36 is adapted to clamp these ribbons 30 and 31 to the translator frame with the cooperation of screws 37 which pass through the clamping plate 36, the holes in the ribbon and are threaded into the translator frame 22.

The ribbons 32 and 33, which extend in the opposite direction, that is downwardly, are fastened in a similar manner to adjustable blocks 38 and 39 with the cooperation of pins 40, clamping plates 41 and screws 42.

These adjustable blocks 38 and 39 are substantially L shaped and positioned in cut-out portions of the vertically extending plate of the translator frame so that the face of the L shaped block, to which the ribbons are clamped, is flush with the face of the plate. Equal and uniform tension in all the ribbons is of prime importance to the proper operation of the device and for this reason a separate block 38 or 39 is provided for each of the ribbons 32 and 33. The blocks 38 and 39, as hereinbefore mentioned, are assembled in cut-out portions in the lower end of the vertically suspended translator frame—in such a manner that faces of the blocks 38 and 39 remain flush with the operating face of the frame when the positions of the blocks are adjusted. To accomplish this, a plate 45 is clamped by means of screws 46 to the short, horizontally extending lower arm of the Z shaped plate 22. Since the width of the "cut-outs" in the plate 22 is just sufficient to permit a block to enter freely, rotation of adjusting screws 43 and 44, projecting through suitably positioned apertures in the plate 45, which are threaded into the blocks results in exactly vertical movement of the blocks 38 and 39.

The translator frame, due to its universal suspension from the side bars 14 and 15 will readily align itself to the cylindrical member 29 and the flexible metallic ribbons being clamped to an accurately ground flat plate have no inclination to twist.

Since the anchorages of the ribbons 30 and 31 have no adjustment it is preferred that the holes, through which the pins 35 and screws 37 project, be pierced in a suitable die after the ribbons are assembled to the cylindrical member 29. The tensions of the ribbons 32 and 33 are adjustable and such precaution need not be taken. Since there are two ribbons of identical cross section extending in each of the opposed directions, reactions, due to the elasticity of the ribbons, are balanced and neutralized and therefore do not adversely influence the weighing result.

In the operation of the scale, when a load is placed on the platform 2 a downward pull is exerted on the pull rod 3. This pull is transmitted through the ribbons 5 to the power sectors 6 causing an outward swing of the pendulums 7 until the pendulum weights 47, fixed to the pendulums, assume a position in which their weight moments exactly counterbalance the weight moment resulting from the load. During the swinging movement of the pendulums to offset the weight of the load being weighed the horizontally extending side plates 14 and 15, as well as the translator frame 22 suspended therefrom are moved vertically upwardly. The ribbons 30 and 31, which in the zero position of the pendulums are wound on the cylindrical member 29 rotate this member 29 and the indicator shaft 28, in the ball bearings 27, through an angle corresponding to the amount of the load and an indicator 48 clamped on the shaft 28 by means of a hub 49 partakes of this angular movement and cooperates with a series of indicia 50 printed on a chart 51, suitably positioned in the housing 11, to visibly indicate the weight of such load. When the ribbons 30 and 31 unwind from the cylindrical member 29, the ribbons 32 and 33 are wound up an equal length, and when the load is removed from the platform and the pendulums drop towards the "zero" position the frame 22 also descends and the ribbons 32 and 33 now unwind and return the indicator to its initial position.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, weighing mechanism comprising load receiving means, pendulum load counterbalancing mechanism operatively connected to said load receiving means, load indicating means and means for operatively connecting said pendulum load counterbalancing mechanism to said indicating means, said connecting means including a frame pivotally connected to said pendulum load counterbalancing mechanism and partaking of its movement, a member pivotally mounted in said frame and adapted to rotate about an axis parallel to the axis of rotation of said pendulum load counterbalancing mechanism, a member pivotally connected to said aforementioned member and adapted to oscillate in a plane extending at right angles to the oscillating axis of said pendulum load counterbalancing mechanism and a substantially Z-shaped plate, adapted to freely rotate about a vertical axis, connected to said second mentioned oscillating member and flexable means for connecting said substantially Z-shaped plate to said indicating means.

2. In a device of the class described, in combination, load weighing mechanism and load indicating means associated therewith, means for translating reciprocatory motion of said weighing mechanisms into rotative movement of said load indicating means, said translating means comprising a cylindrical member mounted for rotation in a stationary member of said weighing mechanism, a rigid plate universally suspended from a member of said weighing mechanism having reciprocatory motion, a plurality of bandlike metallic ribbons having one of their ends clamped to said universally suspended plate, their other ends overlying a portion of the periphery of said cylindrical member and fastened thereto by means not projecting over its peripheral surface, an equal plurality of similar ribbons having their upper ends overlying the periphery of said cylindrical member and their lower ends clamped to means adjustably secured to said rigid plate, said adjustable means comprising blocks, each of said blocks having a face disposed in the plane of a face of said rigid plate, and a screw threaded into each of said blocks and passing through a flange of said rigid plate for adjusting the tension of said ribbons independently of each other.

3. In a device of the class described, in combination, load weighing mechanism and load indicating means associated therewith, means for translating reciprocatory motion of said weighing mechanisms into rotative movement of said load indicating means, said translating means comprising a cylindrical member mounted for rotation in a stationary member of said weighing mechanism, a rigid plate universally suspended from members of said weighing mechanism having reciprocatory motion, a number of metallic ribbons having one of their ends clamped to the upper portion of said universally suspended rigid plate, their other ends overlying a portion of the periphery of said cylindrical member and fastened thereto by means not projecting over its peripheral surface, an equal number of similar ribbons having their upper ends overlying a portion of the periphery of said cylindrical member, their lower ends being clamped to means adjustably secured to said rigid plate, said adjustable means comprising blocks and each of said blocks having a flat face disposed in the plane of a face of said rigid plate.

4. In a device of the class described, in combination, load weighing mechanism and load indicating means associated therewith, means for translating reciprocatory motion of said weighing mechanisms into rotative movement of said load indicating means, said translating means comprising a cylindrical member mounted for rotation in a stationary member of said weighing mechanism, a rigid plate universally suspended from members of said weighing mechanism having reciprocatory motion, a number of metallic ribbons having one of their ends clamped to the upper portion of said universally suspended plate, their other ends overlying a portion of the periphery of said cylindrical member and fastened thereto by means not projecting over the peripheral surface of said cylindrical member, an equal number of similar ribbons having their upper ends overlying a portion of the periphery of said cylindrical member and their lower ends clamped to means adjustably secured to said rigid plate.

SAMUEL N. HURT.